United States Patent [19]
Monchamp et al.

[11] 3,719,901
[45] March 6, 1973

[54] LASER WITH A MONOCRYSTALLINE YALO$_3$:ND$^{+3}$ ACTIVE MEDIUM

[75] Inventors: Roch R. Monchamp, Waltham; Marvin J. Weber, Wayland; Michael Bass, Lexington, all of Mass.

[73] Assignee: Raytheon Company, Lexington, Mass.

[22] Filed: March 12, 1971

[21] Appl. No.: 123,635

Related U.S. Application Data

[62] Division of Ser. No. 886,617, Dec. 19, 1969, Pat. No. 3,614,662.

[52] U.S. Cl. .......................... 331/94.5, 252/301.4
[51] Int. Cl. ........................ H01s 3/16, C09k 1/68
[58] Field of Search .................. 331/94.5; 252/301.4

[56] References Cited

OTHER PUBLICATIONS

Ohlman et al., "Research–Incrystals", AFSC, Progress Report, AD649831, Dec. 1966, pp. I–VIII, 1–56.
Geller et al., ACTA Crystallographica, Vol. 9, 1956, pp. 563–8,

*Primary Examiner*—Ronald L. Wibert
*Assistant Examiner*—R. J. Webster
*Attorney*—Milton D. Bartlett, Joseph D. Pannone, Herbert W. Arnold and David M. Warren

[57] ABSTRACT

Nd$^{+3}$ ions serve as a dopant in monocrystalline YAlO$_3$ forming an active solid state lasing medium.

12 Claims, 1 Drawing Figure

PATENTED MAR 6 1973
3,719,901
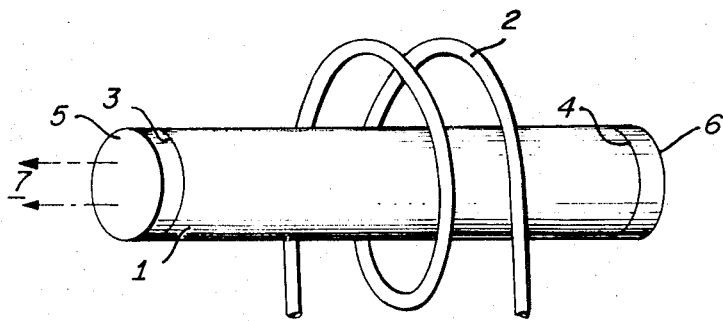
INVENTORS
ROCH V. MONCHAMP
MARVIN J. WEBER
MICHAEL BASS

LASER WITH A MONOCRYSTALLINE YAlO₃:Nd⁺³ ACTIVE MEDIUM

DIVISIONAL APPLICATION

This application is a division of application Ser. No. 886,617, now U.S. Pat. No. 3,614,662 entitled A Laser With a Monocrystalline $YAlO_3:Nd^{+3}$ Active Medium, filed Dec. 19, 1969.

BACKGROUND OF THE INVENTION

This invention relates to fluorescent materials and devices utilizing such materials. More particularly, the invention relates to laser materials and devices generating coherent light in the infra-red region, especially in the wavelength range from 0.86 microns to 1.44 microns.

It is known that trivalent neodymium is an active laser ion producing coherent light in the infra-red region when suitably stimulated. $Nd^{+3}$ ions have been used as a dopant in a calcium tungstate host lattice (U.S. Pat. No. 3,225,306 to L. F. Johnson and glass (U.S. Pat. No. 3,270,290 to R. D. Maurer). These hosts suffer many disadvantages. For example, calcium tungstate is difficult to fabricate due to its tendency to crack. Also, the tungstate crystal and glass have a low thermal conductivity which precludes their use with high average power pump sources.

Yttrium aluminum garnet (YAG), having the molecular formula $Y_3Al_5O_{12}$, is a monocrystalline laser host material found to be far more suitable for high power pulse and CW laser operation. However, the power output of a suitably optically pumped YAG laser rod depends upon the concentration of $Nd^{+3}$ dopant, which in YAG is a maximum of $2 \times 10^{20}$ ions/cm³ consistent with high optical quality required for lasing. Exceeding this maximum normally produces bubbles, second phase precipitants, and strain in YAG.

It is, accordingly, an object of this invention to devise a material capable of fluorescing in the infra-red region, especially between 0.86 to 0.94, 1.05 to 1.11, and 1.31 to 1.44 microns. Relatedly, the material should be in the solid state and capable of high power pulse and CW operation. It should be resistant both to warping and cracking. Lastly, the material should exhibit rapid crystal growth, uniformity of doping, and ease of fabrication.

It is yet another object of this invention that the host material with its $Nd^{+3}$ dopant also permits the use of a codopant to enhance the efficiency with which the lasing medium may be optically pumped.

SUMMARY

The above objects are satisfied in an embodiment in which an active laser medium is formed from monocrystalline $YAlO_3$ host lattice, a portion of whose $Y^{+3}$ ions have been replaced by $Nd^{+3}$ ions with amounts of $Cr^{+3}$ added for the optically most efficient operation. With $YAlO_3$ it is possible to replace a higher proportion of $Y^{+3}$ ions with $Nd^{+3}$ ions while still maintaining the high crystal quality suitable for laser use.

When the $YAlO_3$ crystals are grown according to the method found in copending U.S. Pat. application No. 886,932 to Roch R. Monchamp, Marvin J. Weber, and Edward M. Comperchio, entitled Single Crystal $YAlO_3$ Laser Host Material and Method for Making Same, filed on Dec. 22, 1969, then the growth rates are substantially faster than those of YAG.

The drawing is a perspective view of an infra-red device utilizing compositions of the invention.

DESCRIPTION OF THE PREFERRED EMBODIMENT

Laser experiments were made using four laser rods formed from monocrystalline $YAlO_3$ doped with respectively $1.3 \times 10^{21}$, $6.9 \times 10^{20}$, $3 \times 10^{20}$, and $1.6 \times 10^{20}$ $Nd^{+3}$ ions per cm³. The rods were grown using the technique of the aforementioned copending U.S. application. These rods were typically 5 m.m. cross-section diameter and length of 50 m.m. As an example, the $1.6 \times 10^{20}$ ion/cc doped rod was formed from a boule derived from a melt of 237.076 grams of $Y_2O_3$, 108.416 grams of $Al_2O_3$, and 4.508 grams of $Nd_2O_3$. The melt was seeded with a $YAlO_3$ crystal, which seed was rotated at 20 RPM and pulled out of the melt at a rate of 0.300 inches per hour. The resulting crystal boule size was 75 millimeters in length with a cross-section diameter varying between 10 to 11 millimeters. The crystal exhibited a violet color. The crystal orientation was approximately 7° from one of its optic axes.

The ends of each rod were finished flat and parallel with an anti-reflection coating of less than 0.25 percent reflectivity in the wavelength range between 0.86 to 1.44 microns. Mirrors were used and disposed opposite the finished flat rod ends and were also coated to have the proper reflectivity in this spectral region. The mirrors were used for both the pulsed and CW test operations.

CW laser studies were performed using two 2-inch arc length, 4 millimeter bore, krypton arc lamps in a gold plated double ellipse. The $1.6 \times 10^{20}$ $Nd^{+3}$ ions/cc doped rod produced 300 milliwatts of output at an input power of 4,000 watts. Pulsed laser studies employed one 2-inch arc length, 4 millimeter bore, xenon flash lamp in a gold plated single ellipse.

The preferred lasing wavelength of these $Nd^{+3}$ doped rods was 1.0795 microns ± 3A. The emission was strongly linearly polarized in the plane of the optic axes. When a polarizer was placed within the laser cavity and rotated so that there was no feedback for the preferred polarization, then lasing was obtained with the emission polarized in the orthogonal plane and with the wavelength being shifted to 1.0645 ± 3A. It was observed that the laser remained in the preferred polarization plane and wavelength until the polarizer was rotated more than 70° away from full transmission of the preferred polarization.

Referring now to the drawing, there is shown a rod shaped crystal 1 of $YAlO_3$ having an appropriate concentration of $Nd^{+3}$ ions. Pump energy is supplied by a helical lamp 2 encompassing rod 1 and connected to an energy source not shown. Ends 3 and 4 of rod 1 are ground and polished in the form of confocal spherical surfaces. Reflective layers 5 and 6 are deposited on ends 3 and 4 thereby forming an optical cavity resonator.

Advantageously, layer 6 is totally reflecting while layer 5 includes at least a portion which is only partially reflecting to permit the escape of coherent radiation 7.

Lamp 2 is advantageously of a type which produces intense radiation of a broad band from 3,000 A to 9,000 A. Krypton or xenon lamps are considered useful to pump the material of the invention.

Although the invention has been described with reference to two specific embodiments, this is to be construed by way of illustration and does not limit the scope of the invention. For example, the material of the invention may be used with any concentration of neodymium or $Nd^{+3}$ and $Cr^{+3}$ ions compatible with good optical quality. Furthermore, the material may be used in optical cavity resonators other than the confocal type. The parallel plane resonator, as well as others, may also be employed. Other variations are also possible within the spirit of the invention.

We claim:

1. A single crystal composition of matter consisting of a solid rare earth orthoaluminate doped with rare earth ions, said crystal having an orthorombic lattice structure and enclosing a volume at least equal to 1 cubic centimeter, and having a maximum dimension substantially greater than 1 centimeter.

2. A single crystal composition of matter in accordance with claim 1 wherein said rare earth dopant comprises trivalent neodymium.

3. A single crystal composition of matter in accordance with claim 2 wherein said rare earth orthoaluminate is yttrium orthoaluminate.

4. A composition of matter comprising a solid solution of neodymium ions in crystalline yttrium orthoaluminate wherein said yttrium orthoaluminate comprises a single crystal body, and encloses a volume at least equal to 1 cubic centimeter and has a maximum dimension substantially greater than 1 centimeter.

5. A composition of matter in accordance with claim 4 wherein said neodymium ions are trivalent.

6. A composition of matter in accordance with claim 5 wherein said crystal lattice structure is orthorhombic.

7. A composition of matter comprising a solid solution of yttrium orthoaluminate doped with trivalent neodymium and trivalent chromium ions wherein said yttrium orthoaluminate is an anisotropic orthorhombic single crystal body, and encloses a volume at least equal to 1 cubic centimeter and has a maximum dimension substantially greater than 1 centimeter.

8. An active laser medium consisting of the composition of trivalent neodymium within the concentration range from $1 \times 10^{19}$ ions per cubic centimeter to $2 \times 10^{21}$ ions per cubic centimeter in a single crystal body of anisotropic orthorhombic yttrium orthoaluminate, said body having a maximum dimension substantially greater than 1 centimeter and enclosing a volume at least equal to 1 cubic centimeter.

9. A fluorescent crystalline composition of matter consisting of a single crystal body of solid $YAlO_3$ enclosing a volume at least equal to 1 cubic centimeter a maximum dimension substantially greater than 1 centimeter doped with $Nd^{+3}$ ions within the concentration range from $1 \times 10^{19}$ ions per cubic centimeter to $2 \times 10^{21}$ ions per cubic centimeter.

10. A fluorescent crystalline composition of matter consisting of a single crystal body of solid $YAlO_3$ enclosing a volume at least equal to 1 cubic centimeter a maximum dimension substantially greater than 1 centimeter doped with $Nd^{+3}$ $Cr^{+3}$ ions, in which the $Nd^{+3}$ ions are in the concentration range from $1 \times 10^{19}$ ions per cubic centimeter to $2 \times 10^{21}$ ions per cubic centimeter, and in which the $Cr^{+3}$ ions are within the concentration range from $1 \times 10^5$ ions per cubic centimeter to $1 \times 10^{21}$ ions per cubic centimeter.

11. An active laser medium consisting of the composition of trivalent neodymium and trivalent chromium in a single crystal body of anisotropic orthorhomic crystalline yttrium orthoaluminate enclosing a volume at least equal to 1 cubic centimeter and having a maximum dimension substantially greater than 1 centimeter, the neodymium being within the concentration range from $1 \times 10^{19}$ ions per cubic centimeter to $2 \times 10^{21}$ ions per cubic centimeter, and the chromium being within the concentration range from $1 \times 10^5$ ions per cubic centimeter to $1 \times 10^{21}$ ions per cubic centimeter.

12. A composition of matter in accordance with claim 1 wherein said maximum dimension is at least 5 centimeters.

* * * * *